United States Patent
Broyhill

[11] 3,930,690
[45] Jan. 6, 1976

[54] AGITATOR SHAFT SEAL

[76] Inventor: Roy F. Broyhill, Dakota City, Nebr. 68731

[22] Filed: Jan. 17, 1975

[21] Appl. No.: 541,851

[52] U.S. Cl. .............................. 308/36.1
[51] Int. Cl.² ............... F16C 1/24; F16C 33/72
[58] Field of Search ...... 308/1 R, 36.1; 259/1, 107, 259/109

[56] References Cited
UNITED STATES PATENTS

| | | | |
|---|---|---|---|
| 1,304,231 | 5/1919 | Wilson | 308/36.1 |
| 2,518,338 | 8/1950 | Lampe | 308/36.1 |
| 2,829,931 | 4/1958 | DePree et al. | 308/36.1 |
| 3,190,702 | 6/1965 | Flick | 308/36.1 |
| 3,359,048 | 12/1967 | Lowe | 308/36.1 |
| 3,606,260 | 9/1971 | Rubin | 308/36.1 |
| 3,718,209 | 2/1973 | Moslo | 308/36.1 |

Primary Examiner—Lloyd L. King
Attorney, Agent, or Firm—Morton S. Adler

[57] ABSTRACT

An agitator shaft for revolving attached blades within a fluid containing tank rotates in support bearings free of any attachment to the tank. A shaft mounted housed seal unit exteriorly of the tank comprises a packing gland and a fitting connected by a flexible tubing with the fitting having a bore and the tank having a complementary opening each substantially larger than the diameter of the shaft. The shaft extends axially through the fitting and opening into the tank and the fitting is secured in the opening. The flexible tubing is designed to absorb torque from the seal unit and such unit permits the shaft to be mounted with equal facility and efficiency on tanks of plastic, rubber or metal and materially reduces shaft alignment problems.

7 Claims, 6 Drawing Figures

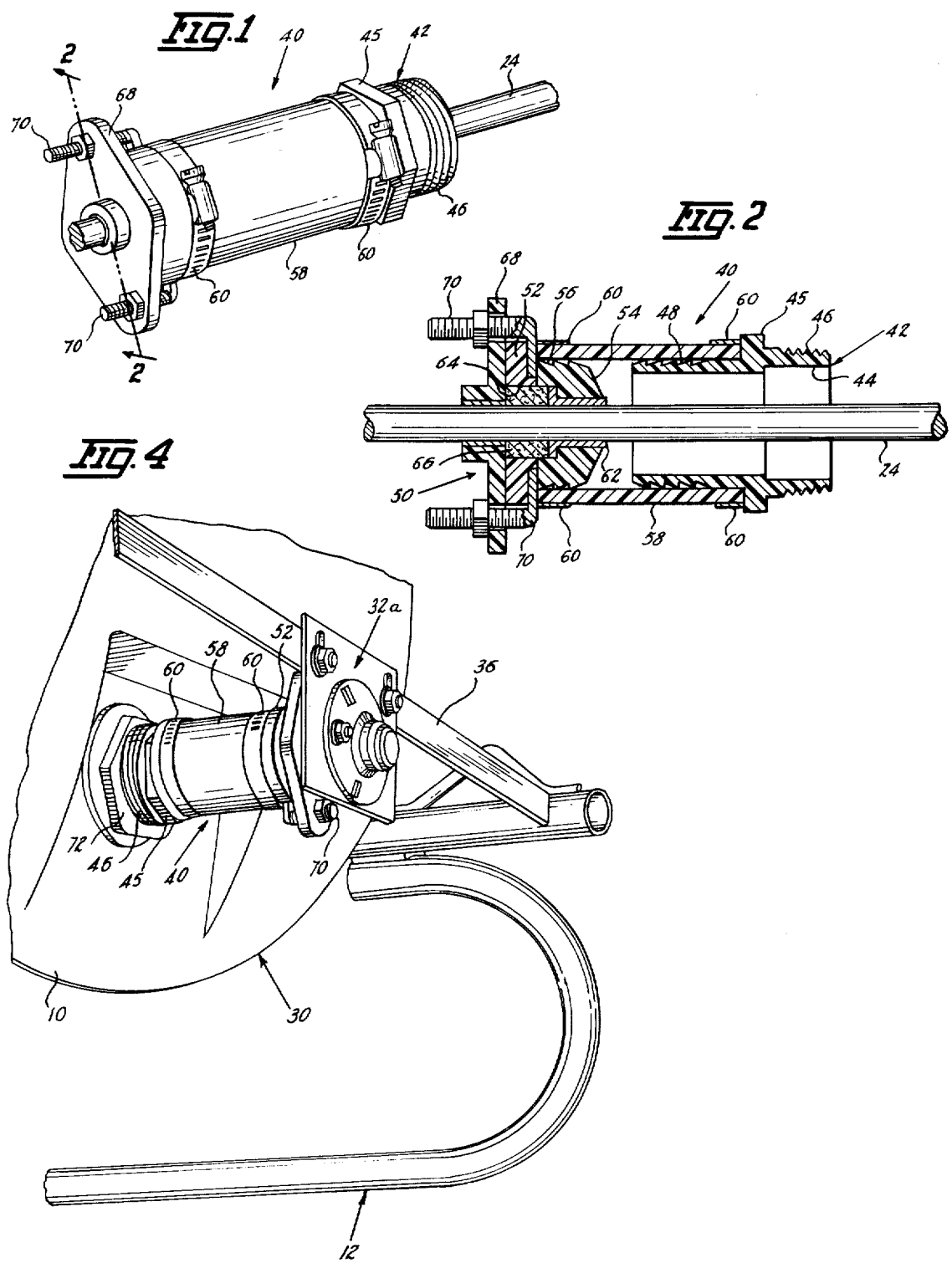

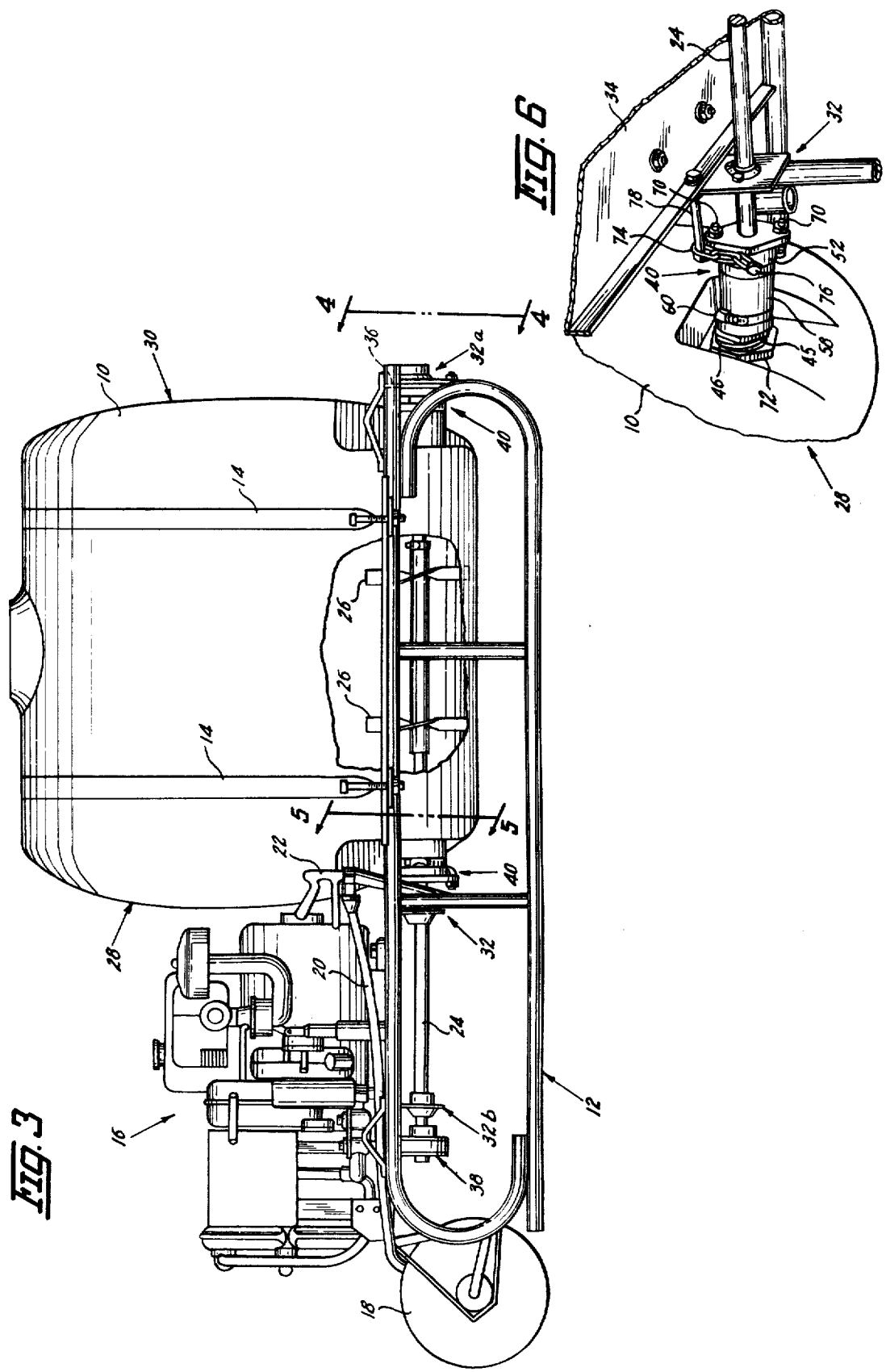

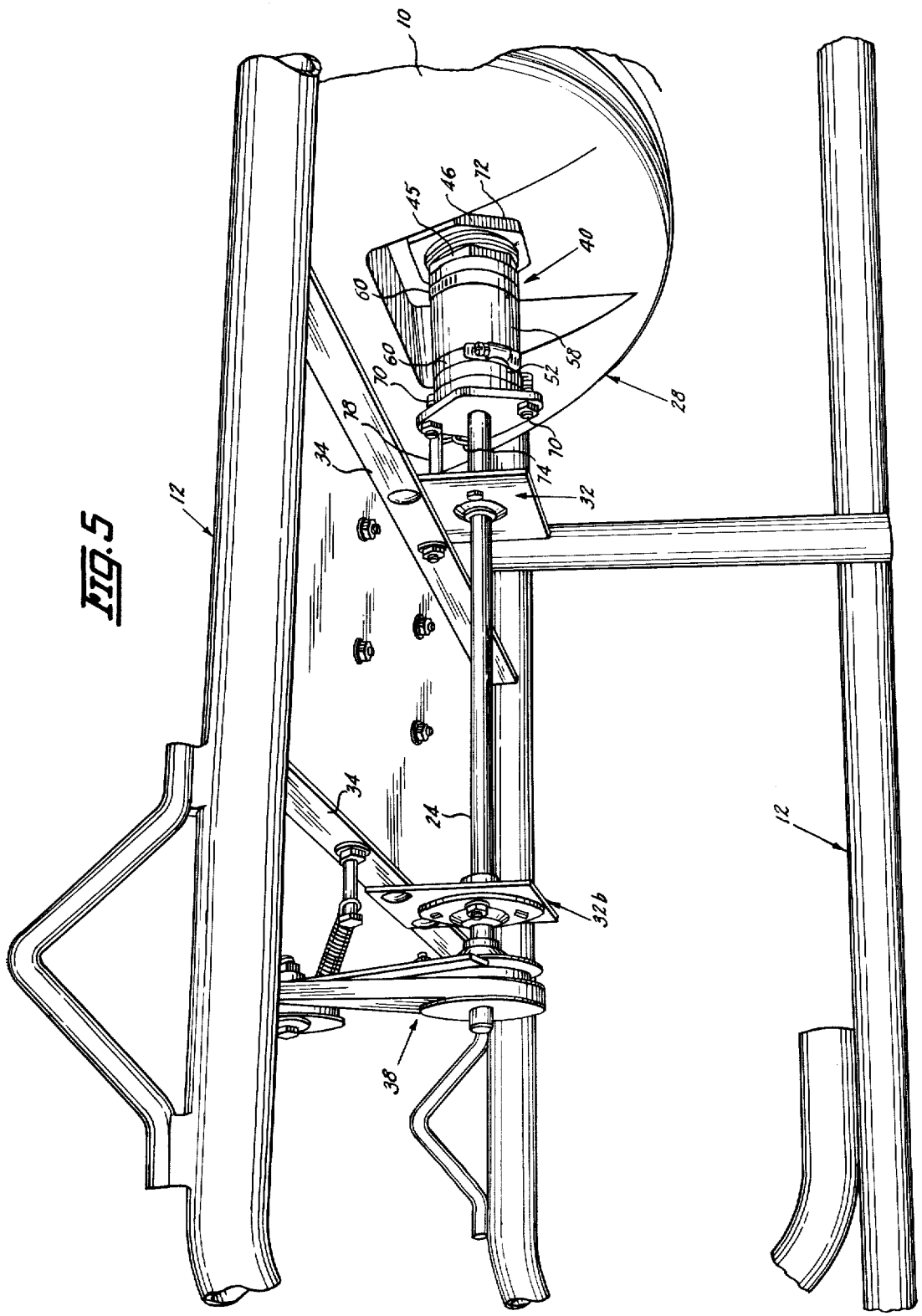

AGITATOR SHAFT SEAL

BACKGROUND OF THE INVENTION

This invention relates to improvements in sealing and mounting means for agitator shafts as are used with fluid containing tanks.

Fluid contents such as agricultural chemicals and the like that are dispensed from tank containers require stirring, mixing and agitating at times as is well known and a common method of accomplishing this is to mount a rotatable blade equipped shaft through the tank. For this purpose, it has heretofore been the practice to affix suitable shaft bearings and seals directly in the wall of the tank so as to be a part thereof and while this has generally been satisfactory with what has been more or less the conventional steel type tank, I have observed that in the growing development and use of relatively flexible materials such as plastic and the like for tank construction, the end play on the tank or "oil canning" results in excessive wear to the tank mounted bearings and seals so that the matter of repairs and replacement is a serious cost factor. Accordingly, the principal object of the present invention is to provide for the mounting of an agitator shaft for a fluid containing tank in bearings and mounts and seals exteriorly of and independent of direct attachment to the tank.

A further object herein is to provide an agitator shaft mounting as characterized which materially simplifies the operational attachment of the shaft to the tank and any tank replacements.

More particularly, it is an object herein to provide an agitator shaft mounting as characterized wherein the shaft bearings are supported on a tank skid or support frame free of direct contact with the tank and the shaft seal, located exteriorly of the tank, is affixed thereto by an appropriate fitting and flexible hose of sufficient size relative to the shaft diameter so as to substantially reduce any alignment problems.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 1 is a perspective view of the new shaft seal unit forming a part of this invention, FIG. 2 is a cross sectional view taken on the line 2—2 of FIG. 1, FIG. 3 is a side elevational view of a skid mounted tank showing an agitator shaft mounted thereto according to this invention and also showing for purposes of illustration the general motor unit for operating the agitator shaft and dispensing the contents of the tank, FIG. 4 is an enlarged perspective view of the bearing and seal mounting for the agitator shaft at one end of the tank taken from the line 4—4 of FIG. 3, FIG. 5 is an enlarged perspective view of the bearing and seal mounting for the agitator shaft at the other end of the tank taken from the line 5—5 of FIG. 3, and FIG. 6 is a perspective view showing the opposite side of the seal and bearing just exteriorly of the tank from that shown in FIG. 5.

DESCRIPTION OF THE PREFERRED EMBODIMENTS

Referring to the drawings, reference is first made to FIG. 3 where there is shown for illustration the general environment in which the present invention is most advantageously employed. As seen in FIG. 3, a fluid containing tank 10 is mounted to a frame supporting skid 12 by any suitable means such as the metal straps 14. A motor assembly 16 is also mounted to skid 12 for dispensing the contents of tank 10 through a reel mounted 18 hose 20 and nozzle 22 in a well known manner. An agitator shaft 24 mounted through tank 10 includes blades 26 disposed within tank 10 as shown and said shaft 24 and blades 26 are operatively connected to motor assembly 16 for rotation all in a well known manner and for which no invention is claimed except as directed to my new and improved means for the mounting of shaft 24 as will hereinafter appear.

The construction of tanks as shown at 10 of steel has long been a common practice and because of the inherent strength of such type tanks, the bearings and seals for shaft 24 have traditionally been mounted directly in the walls of the tank where they have generally functioned in a satisfactory manner. However, with the advent of tanks made more economically from relatively flexible materials such as plastic and the like, and with the bearings and seals continued to be mounted in the tank walls, the costs for repairs and maintenance of such bearings and seals has materially increased due to the excessive wear resulting from end play on the tank of such non-metal material and in the development of the present invention, I have endeavored to overcome this problem and provide a mounting for the bearings and seals that can be used with equal facility and efficiency on tanks of any material whether of metal or otherwise since such mountings are not affixed to the tank in the manner heretofore done.

For purposes of description, end 28 of tank 10 adjacent the motor assembly 16 is designated as the front end and the opposite end 30 of tank 10 as the rear end. In accordance with the present invention, the shaft 24, passing through tank ends 28 and 30 in the lower portion of the tank 10 as seen in FIG. 3, is supported exteriorly of end 28 (FIGS. 5 and 6) in a suitable bearing mount assembly 32 of any well known construction that is secured to and depends from one side of a rigid platform 34 forming a part of skid 12 to which the motor assembly 16 is attached, and exteriorly of tank end 30, shaft 24 is supported in a similar bearing mount assembly 32a (FIG. 4) secured to and depending from a rigid crossbar 36 forming a part of skid 12. As seen in FIG. 5, shaft 24 extends forwardly from bearing mount 32 below platform 34 for support in bearing mount 32b secured to the other side of platform 34 and at which point it is operatively connected to motor assembly 16 by a pulley and belt arrangement 38 in a well known manner. Thus far described, it will be understood that bearing mounts 32, 32a and 32b are securely attached to rigid supports wholly exteriorly of and independent from tank 10.

With reference now more particularly to FIGS. 1 and 2, there is shown my new shaft seal unit designated generally by the numeral 40 which is one of the important novel features of this invention and, as will appear, separate like seal units 40 are mounted on shaft 24 intermediate bearing mount 32 and tank end 28 and bearing mount 32a and tank end 30.

Seal unit 40 includes a cylindrical fitting 42 having a bore 44 substantially larger than the diameter of shaft 24 (FIG.2) and intermediate the ends of fitting 42, there is provided an external hex flange 45 for receiving a tightening tool in a well known manner. At one side of flange 45, fitting 42 is externally threaded as at 46 to form a male plug insert end and at the other side of flange 45, fitting 42 is grooved in a serrated outline 48 to form a hose insert end. A packing gland assembly 50 includes a flange ring or shoulder 52 from which there projects the integral concentrically reduced body portion 54 provided externally with grooves in a serrated outline 56 similar to 48 and fitting 42 is secured to the gland assembly 50 by a flexible hose or tubing 58, preferably of plastic, which embraces the respective surfaces 48 and 56 and is secured thereto by hose clamps 60. Body 54 is provided with a shaft alignment bushing 62, preferably of bronze, stainless steel or the like (FIG. 2) and includes chamber 64 designed to receive commercially available seals or rope packing for field repair expedient, if necessary, represented by the numeral 66. A push ring 68 is secured to the outer face of flange 52 by means of fastening bolts 70 secured to such flange.

With the seal unit 40 constructed and assembled as described, it is arranged relative to shaft 24 as seen in FIGS. 4 and 5 where the male end 46 of fitting 42 is threadably engaged with a suitable female plug 72 sealably affixed to tank ends 28 and 30 as shown and thus attached, it will be apparent that shaft 24 is provided with ample clearance at tank ends 28 and 30 so that shaft alignment problems at these points are eliminated for all practical purposes. A torque chain 74 is linked at one end to a stud bolt 76 anchored in flange 52 and linked at its other end to a bolt 78 secured to platform 34 as best seen in FIG. 6 and with this arrangement, torque from the gland seal is absorbed by the tubing 58 and chain 74 with resulting longer life and less maintenance and replacement needs for the bearing mounts and seals. Further, with the seal and bearing mounts as described, the matter of tank replacement is materially simplified relative to present practices and shaft 24 can now be mounted with equal facility and satisfactory operation to tanks of metal or non-metal construction. Accordingly, in view of the foregoing, it is thought a full understanding of the construction and operation of this invention will be had and the advantages of the same will be appreciated.

I claim:

1. A method of applying a shaft seal to an agitator shaft for a tank for containing fluids, comprising the steps of:

providing an opening in the tank wall substantially larger than the diameter of the shaft, arranging a portion of the shaft within the tank by passing it axially through the opening therein so that a portion remains exteriorly of the tank, providing full and complete support for the shaft exteriorly of the tank and free of attachment thereto, encasing the shaft exteriorly of the tank with a packing gland equipped seal unit having one end with a bore complementary to said opening, and connecting said one end of said seal unit to the tank at the point of the opening therein.

2. A method as defined in claim 1 including providing bearing supports for the shaft exteriorly of the tank and free of attachment thereto.

3. A method as defined in claim 1 including providing the seal unit with a flexible tubing connection between the packing gland and the opening in the tank to absorb any torque from the packing gland.

4. In a seal unit for an agitator shaft of the type used for mixing and stirring fluids within a tank, the combination of:

an elongated shaft, bearing means disposed exteriorly of said tank and free of attachment thereto for supporting said shaft, a housed seal unit journalled on said shaft exteriorly of said tank, said seal unit including a fitting member having a bore substantially larger than the diameter of said shaft, said tank being provided with an opening corresponding in size to the bore in said fitting member, one end portion of said shaft extended axially through said fitting member and said opening into said tank, and means for releasably connecting said fitting member to said tank at the point of said opening.

5. A device as defined in claim 4 wherein said housed seal unit comprises:

a packing gland assembly provided with a through bore, and a flexible tubing secured at one end to said packing gland assembly and secured at its other end to said fitting member.

6. A device as defined in claim 5 including means attached to said housed seal unit exteriorly of said tank and free of attachment thereto whereby said means and said flexible tubing absorbs torque from said packing gland assembly.

7. A seal unit as defined in claim 5 including a shaft alignment bushing mounted in the bore of said packing gland assembly.

* * * * *